US011618417B1

(12) United States Patent
Mitchell

(10) Patent No.: US 11,618,417 B1
(45) Date of Patent: Apr. 4, 2023

(54) AUTOMATED VEHICLE JACK

(71) Applicant: Gladys Neal Mitchell, Arlington, TX (US)

(72) Inventor: Gladys Neal Mitchell, Arlington, TX (US)

( * ) Notice: Subject to any disclaimer, the term of this patent is extended or adjusted under 35 U.S.C. 154(b) by 84 days.

(21) Appl. No.: 17/107,508

(22) Filed: Nov. 30, 2020

Related U.S. Application Data

(60) Provisional application No. 62/941,918, filed on Nov. 29, 2019.

(51) Int. Cl.
*B60S 9/04* (2006.01)
*B66F 3/22* (2006.01)

(52) U.S. Cl.
CPC . *B60S 9/04* (2013.01); *B66F 3/22* (2013.01)

(58) Field of Classification Search
CPC .......... B66F 7/00; B66F 7/065; B66F 7/0658; B66F 7/0666; B60S 9/00; B60S 9/04; B60S 9/08; B60S 9/06; B60S 9/12; B60S 11/00
See application file for complete search history.

(56) References Cited

U.S. PATENT DOCUMENTS 3,801,068 A * 4/1974 Kopas ........................ B60S 9/00 254/419
2007/0284499 A1* 12/2007 Hammac .................. B66F 3/12 248/346.01
2009/0057634 A1* 3/2009 Giralde ..................... B60S 9/06 254/424
2016/0288776 A1* 10/2016 Dominguez ............. B60S 9/12

FOREIGN PATENT DOCUMENTS

CN 112267711 A * 1/2021

* cited by examiner

*Primary Examiner* — Lee D Wilson
(74) *Attorney, Agent, or Firm* — Kenneth L. Tolar

(57) ABSTRACT

An automated vehicle jack includes an upper plate and a lower plate with a lifting mechanism disposed therebetween. The upper plate is fixedly attached to a lower side of the vehicle chassis, near each of the front and rear tires. The lifting mechanism is a scissor jack formed of a pair of upper arms pivotally connected to the upper plate and a pair of lower arms pivotally coupled with the lower plate. A motorized drive screw operates the lifting mechanism upon receipt of a predetermined command from a control panel in the vehicle passenger compartment or a portable electronic device.

7 Claims, 8 Drawing Sheets

AUTOMATED VEHICLE JACK

CROSS REFERENCE TO RELATED APPLICATIONS

This application claims priority of provisional application No. 62/941,918 filed on Nov. 29, 2019, the specification of which is incorporated herein by reference.

BACKGROUND OF THE INVENTION

The present invention relates to an automated jack mounted beneath a vehicle chassis that eliminates the burdensome task of unpacking, deploying, and stowing a conventional jack.

DESCRIPTION OF THE PRIOR ART

Changing a flat tire is time-consuming, burdensome, and perilous. A driver must immediately find a suitable location to park the vehicle where the driver can safely change the tire without being struck by passing vehicles. The driver must also locate a level, firm surface that will adequately support the weight of the jack and the raised vehicle. The jack must then be properly positioned beneath designated lifting points on the underside of the vehicle to avoid damaging the chassis. The wheel's lug nuts must be removed, the spare is retrieved from the trunk, positioned on the wheel, and the nuts are reattached. The jack must then be restored to its original location in the trunk or on a rack beneath the vehicle. Unpacking, operating, and returning the jack are laborious, aggravating, and time-consuming tasks.

Accordingly, there is currently a need for a vehicle jack that can be quickly and easily deployed from and returned to a storage location. The present invention addresses this need by providing an automated vehicle jack that is fixedly attached to a vehicle chassis, near each tire. Each jack is automatically deployed and retracted with a control panel or a portable electronic device to eliminate the burdensome task of manually unpacking, raising, lowering, and returning the jack.

SUMMARY OF THE INVENTION

The present invention relates to an automated vehicle jack comprising an upper plate and a lower plate with a lifting mechanism disposed therebetween. The upper plate is fixedly attached to a lower side of the vehicle chassis, near each of the front and rear tires. The lifting mechanism is a scissor jack formed of a pair of upper arms pivotally connected to the upper plate and a pair of lower arms pivotally coupled with the lower plate. A motorized drive screw operates the lifting mechanism upon receipt of a predetermined command from a control panel in the vehicle passenger compartment or a portable electronic device.

It is therefore an object of the present invention to provide a jack that is integral with a vehicle.

It is therefore another object of the present invention to provide a vehicle jack that is automatically deployed and collapsed with an electronic device.

It is yet another object of the present invention to provide a vehicle jack that will not operate when the associated vehicle is in an unsafe state.

Other objects, features, and advantages of the present invention will become readily apparent from the following detailed description of the preferred embodiment when considered with the attached drawings and the appended claims.

DESCRIPTION OF THE PREFERRED EMBODIMENT

Figure 1:
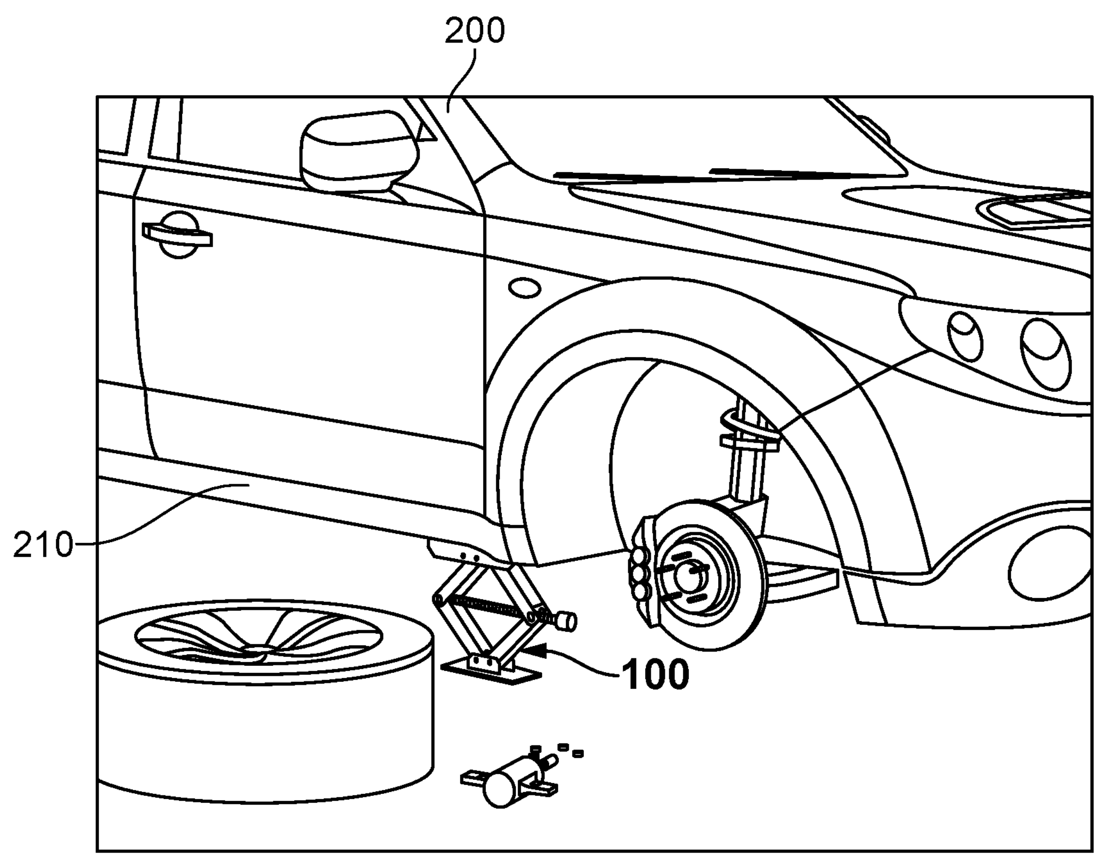
FIG. 1 is a perspective view of the automated jack according to the present invention in an expanded position and mounted on a vehicle chassis.
Figure 2:
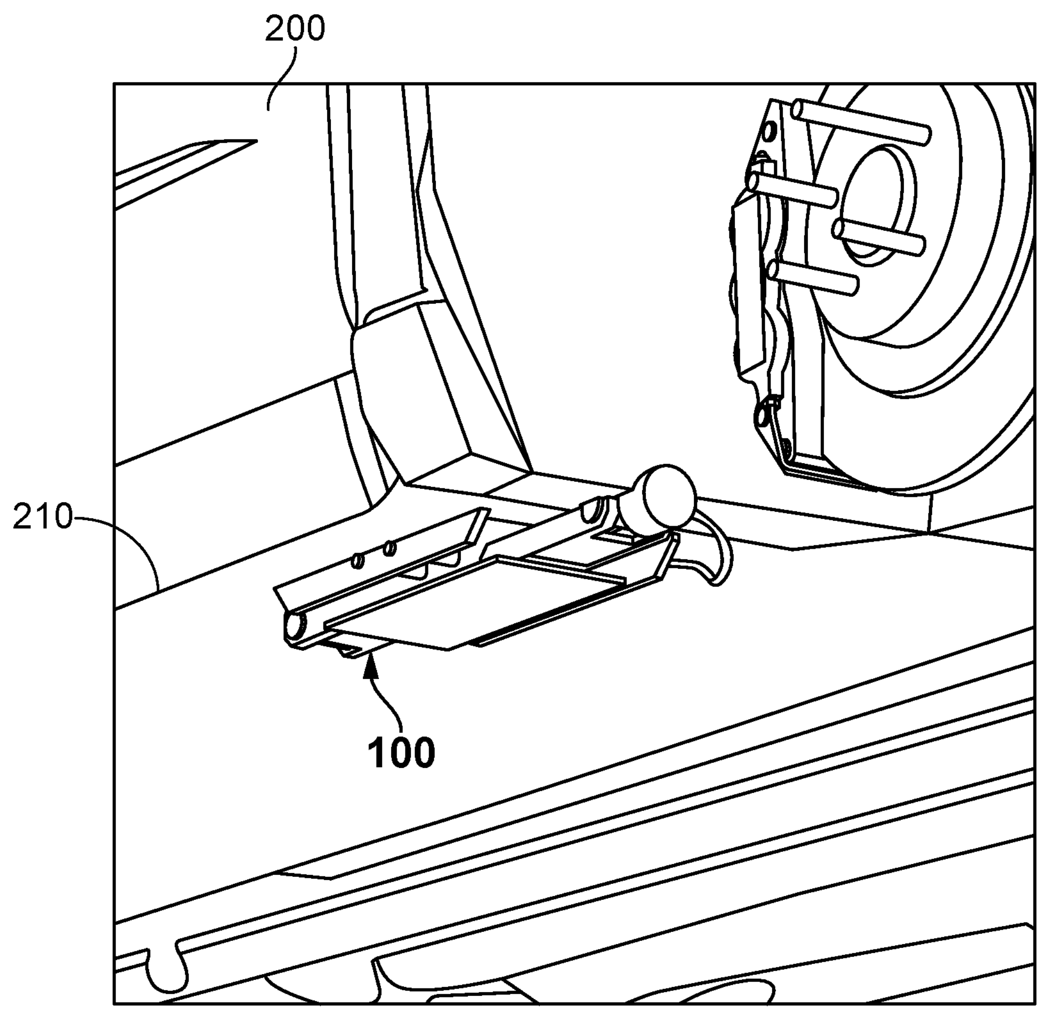
FIG. 2 is a rear, perspective view of the vehicle and automated jack of FIG. 1 with the jack in a collapsed position.
Figure 3:
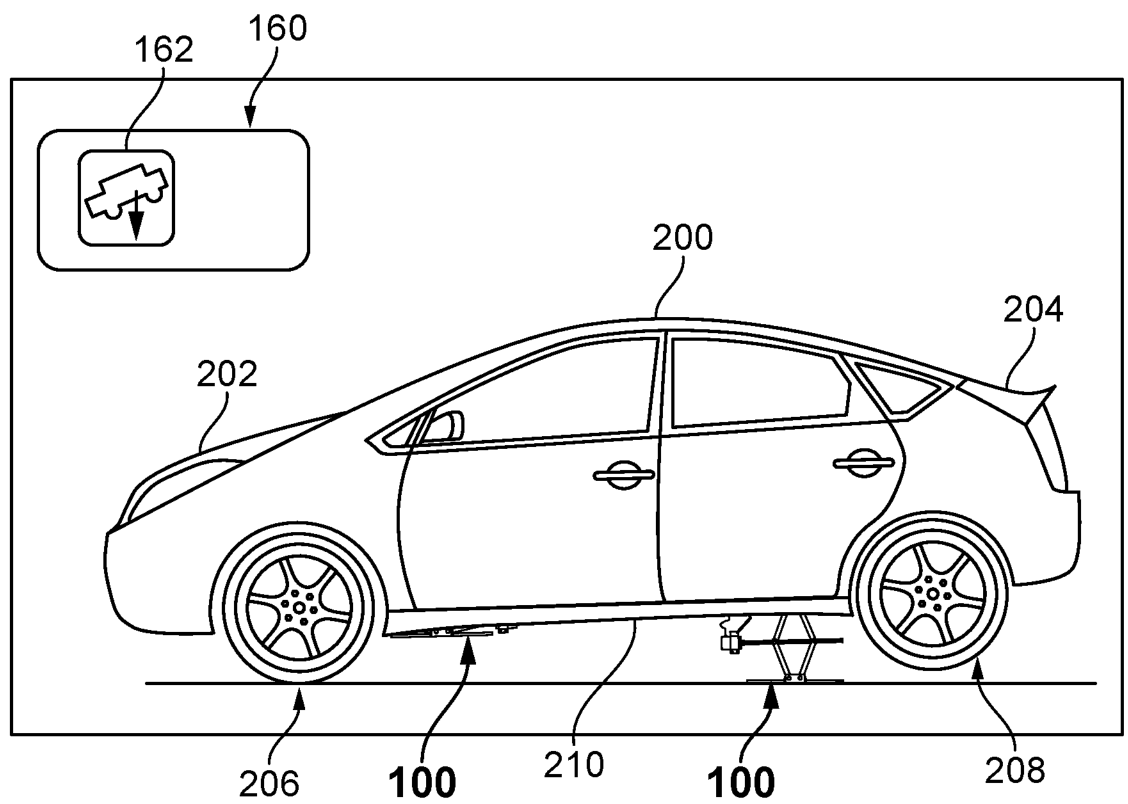
FIG. 3 is a side view of a vehicle with multiple jacks mounted thereon.
Figure 4:
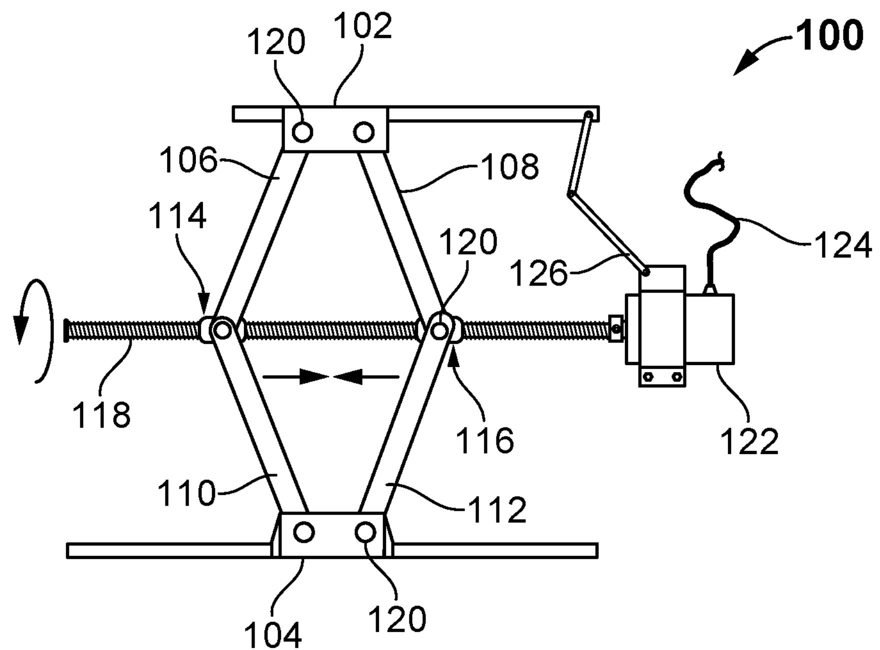
FIG. 4 is a front, plan view of the automated jack in an expanded position.
Figure 5:
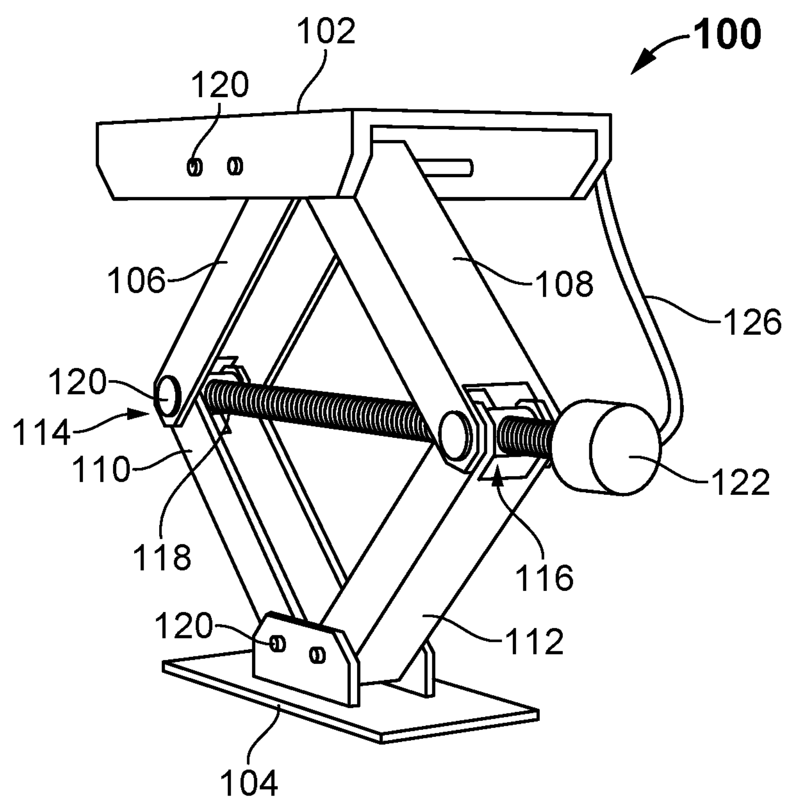
FIG. 5 is a side view of the automated vehicle jack in the expanded position.
Figure 6:
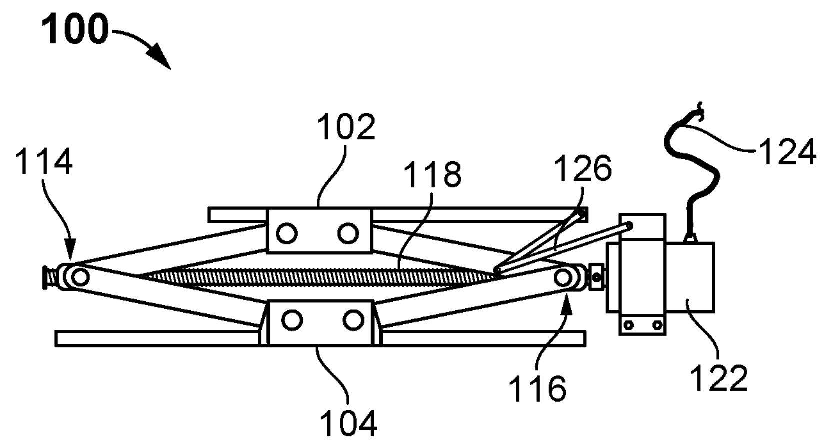
FIG. 6 is a front view of the automated vehicle jack in a collapsed position.
Figure 7:
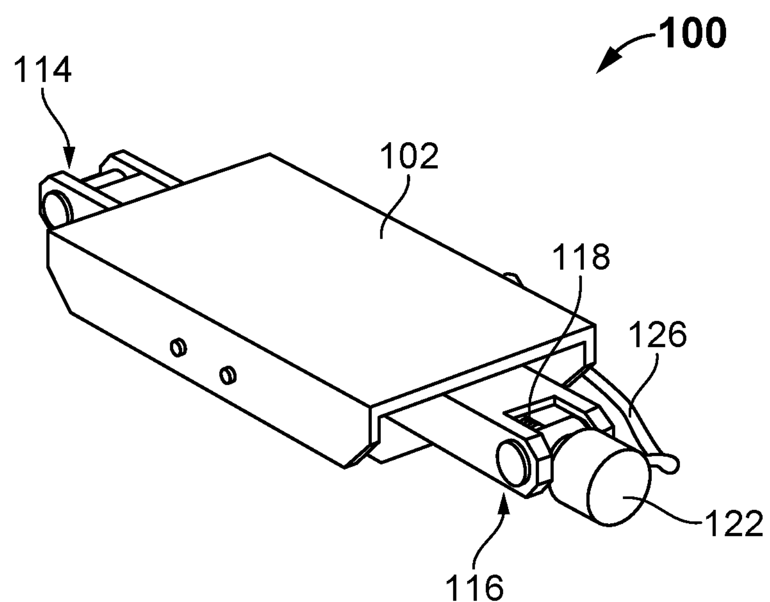
FIG. 7 is an isometric view of the automated vehicle jack in the collapsed position.
Figure 8:
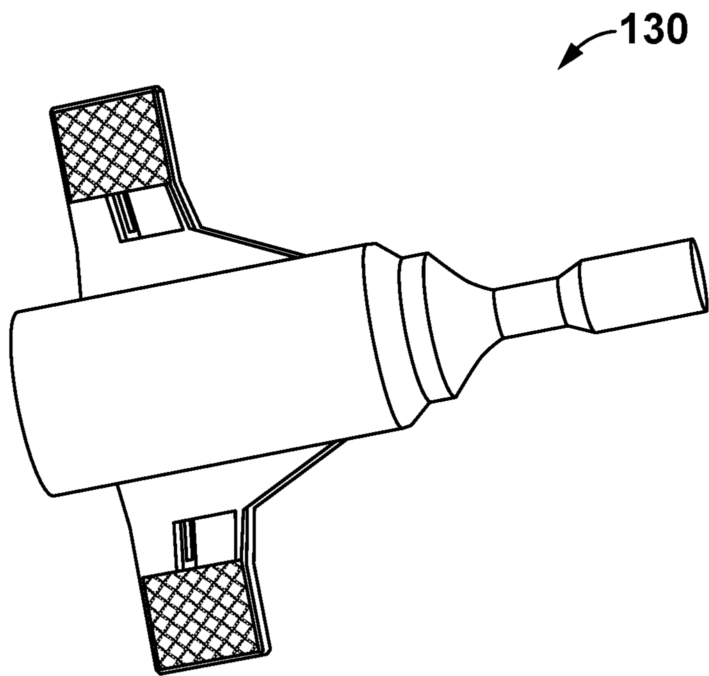
FIG. 8 is a top, perspective view of an associated lug wrench.
Figure 9:
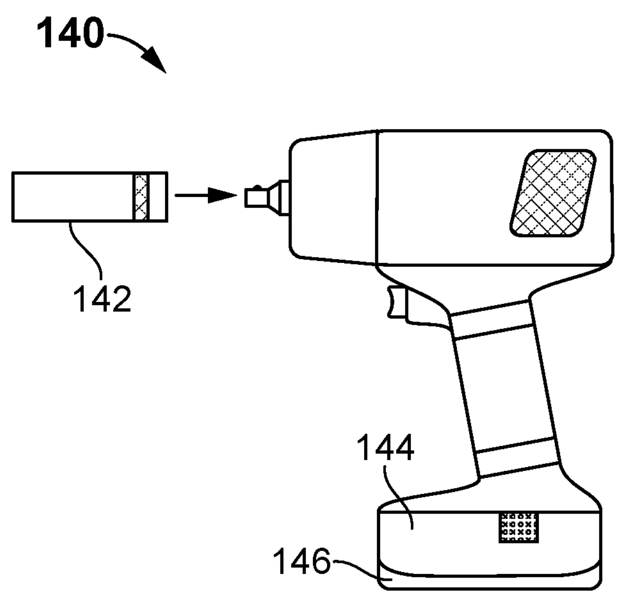
FIG. 9 is a front view of an optional impact driver.
Figure 10:
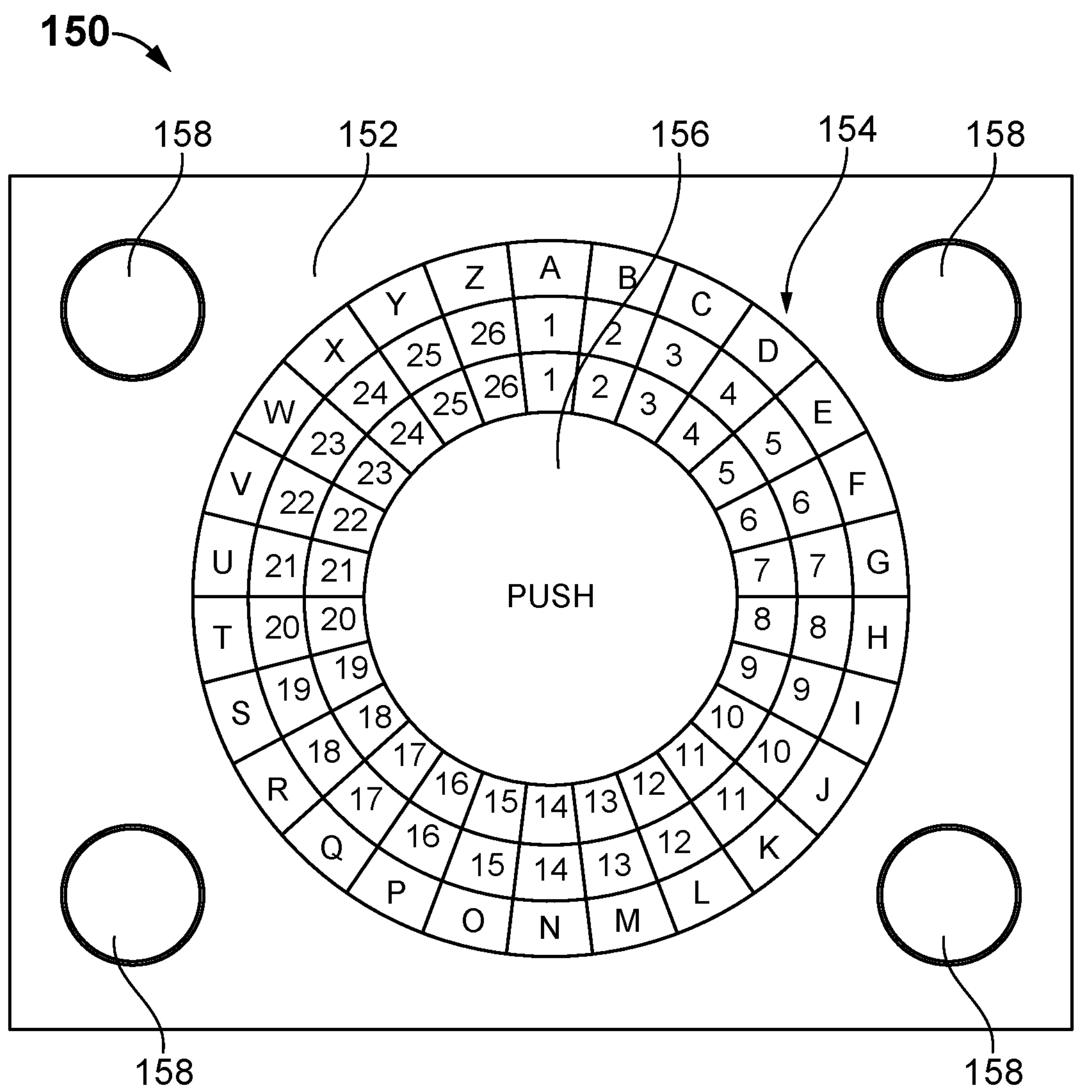
FIG. 10 depicts the control panel that is mounted in the vehicle passenger compartment.

The present invention relates to a vehicle jack 100 for automatically lifting a vehicle 200 having a front end 202, a rear end 204, front wheels 206, rear wheels 208 and an undercarriage or chassis 210. The jack comprises an upper plate 102 and a lower plate 104 with a lifting mechanism disposed therebetween. The upper plate 102 is bolted or welded to a lower surface of the vehicle chassis 210, near each of the front 206 and rear wheels 208. The lifting mechanism is a scissor jack formed of a pair of upper arms 106, 108 having first ends with fasteners 120 that pivotally connect the arms 106, 108 to the upper plate. A pair of lower arms 110, 112 include second ends with fasteners 120 that pivotally couple the arms 110, 112 to the lower plate. The second ends of the upper arms 106, 108 are connected to the first ends of the lower arms 110, 112 with pivotal fasteners 120 so that the arms 106, 108, 110, 112 expand and collapse in a scissor-like fashion. The upper or lower plate may have a U-shaped cross-section that forms a compartment for receiving the arms when collapsed for storage. Accordingly, the jack compactly collapses against the lower surface of the chassis to provide an acceptable ground clearance that allows normal operation of the vehicle.

A drive screw 118 extends through threaded sleeves or brackets 114, 116 at the joint between the upper and lower arms so that rotation of the drive screw 118 either expands or collapses the arms. The drive screw 118 is connected to a reversible, DC stepping motor 122 or similar equivalent. Cables 124 connect to a motor driver for powering the motor and monitoring its current usage. The motor 122 is activated by depressing a predetermined command button described, infra, for automated operation of the lifting mechanism. One or more stabilizing, foldable brace members 126 extend from the motor to the upper plate to prevent the motor housing from spinning during operation.

The jack is operated by a controller mounted in the trunk that is in wireless communication with a control panel 150 within the passenger compartment or a portable electronic device 160, such as a smart phone. The controller includes a housing that contains the motor driver, a printed circuit board, and a wireless communication module, such as that commonly marketed and sold under the trademark Bluetooth™ The control panel 150 and portable electronic device 160 each include a specifically designed software application 162 that is configured to perform all the operations described herein. The control panel depicts a screen 152 having a dial 154 appearing thereon that includes concentric, circular rows of letters and numerals for entering a predetermined passcode to prevent unauthorized or inadvertent use. Each circular row is rotated to align the appropriate combination of numbers and/or letters to unlock the application by pushing a button 156. Adjacent the keypad is a series of buttons for selecting the specific jack to be operated, i.e., left front, left rear, right front, or right rear. The display also depicts RAISE and LOWER buttons 158 for expanding or collapsing the scissor jack accordingly. The buttons may be backlit with LEDs on the controller PCB that illuminate green when the corresponding tire is safe for travel or red when detecting a problem.

Figure 11:
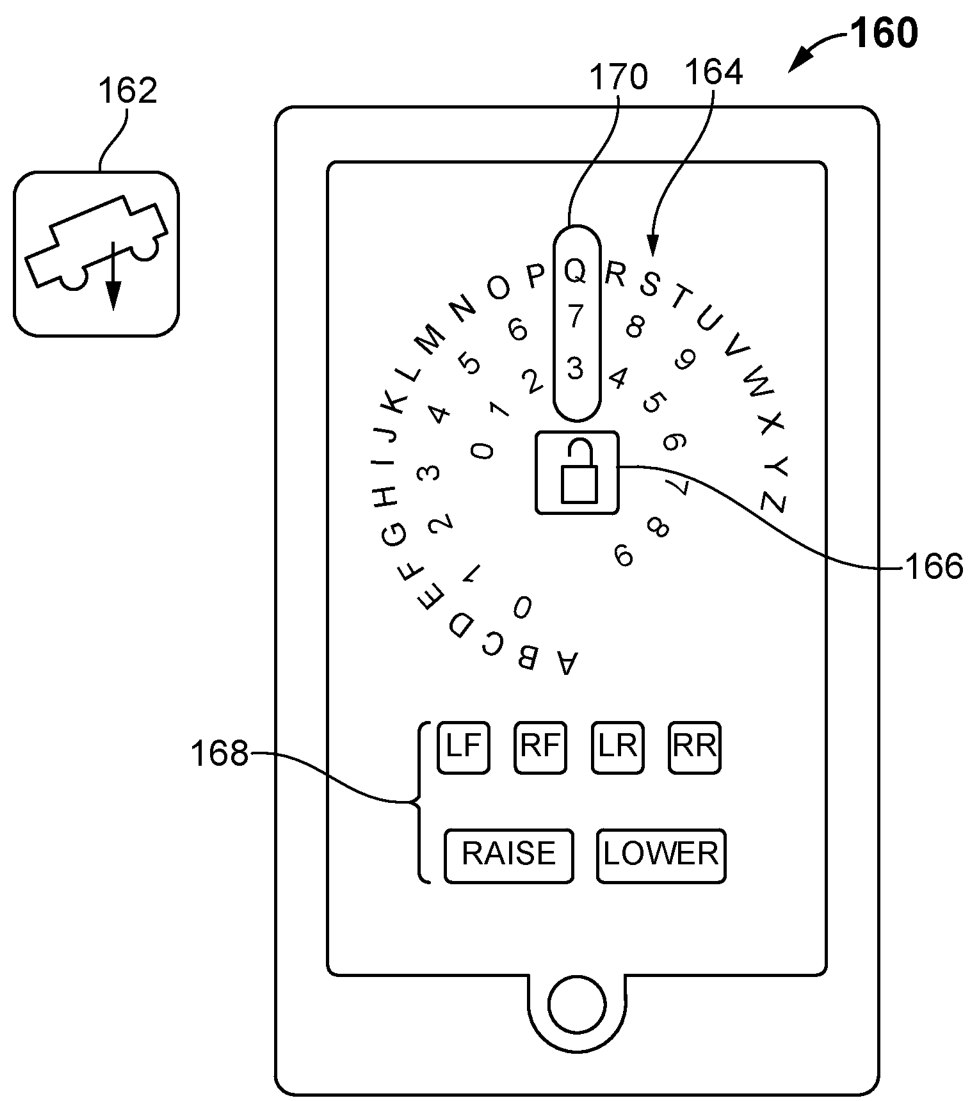
FIG. 11 depicts an electronic device display having the software application according to the present invention.

Now referring to FIG. 11, the electronic device 160 or control panel could depict a more detailed screen having a dial 164 appearing thereon that includes concentric, circular rows of letters and numerals for entering a predetermined passcode 170 to prevent unauthorized or inadvertent use. Each circular row is rotated to align the appropriate combination of numbers and/or letters within a window, and an unlock button 166 is depressed to activate the application. Below the keypad is a series of buttons 168 for selecting the specific jack to be operated, i.e., left front, right front, left rear and right rear. The display also depicts RAISE and LOWER buttons 168 for expanding or collapsing the scissor jack accordingly. The buttons may be backlit with LEDs that illuminate green when the corresponding tire is safe for travel or red if a problem is detected. For example, to replace a flat tire, a user presses the location icon corresponding to the flat tire, at which time the location icon turns red. After selecting the tire, the "RAISE" button is pressed to lift the vehicle 200, where the "RAISE" icon also turns red. After replacing the flat tire with a spare tire, a user presses the "LOWER" icon to retract the jack 100, thereby lowering the vehicle 200 to ground level, at which time the icon turns green.

An adapter couples with the vehicle's onboard diagnostics ("OBD") connector and is in wireless communication with the software application. The adapter allows the application to query the status of certain sensors to determine if the vehicle is moving, the engine is running, or the transmission is not in PARK mode to prevent jack operation in an unsafe state. If an unsafe condition is detected, the application will not initiate.

A lug wrench 130 or an accompanying impact driver 140 could be used to remove the flat tire's lug nuts. The impact driver includes a pistol-shaped housing with a rechargeable battery pack 144 attached to a lower end. The battery includes a pad 146 that protects the housing from impact damage when positioned on gravel or other rough surfaces. Any one of a plurality of sockets 142 may be attached to a driver member for removing the tire's lug nuts. The impact driver also includes a mechanism for adjusting the torque of the driver member when rotating in a clockwise, tightening direction to apply a desired force to the lug nuts. Therefore, a user can apply maximum torque to loosen lug nuts and a reduced, adjusted torque for retightening.

To use the automated vehicle jack upon discovery of a flat tire, a driver pulls over to the nearest safe location to replace the flat with the spare. The driver depresses the icon 162 to load the software application. The app then verifies that the vehicle is stationary, the engine is disabled, and the car is in PARK mode. If so, the application depicts the unlock screen to allow the driver to enter the authorized passcode and press the unlock button. Once the application is activated, the driver depresses the icon(s) 168 corresponding to the desired jack(s) and then selects the RAISE icon, which deploys the selected jack(s). The driver retrieves the impact driver and spare tire from the trunk, removes the lug nuts, swaps the tires, and tightens the lug nuts by applying the selected torque. The driver then presses the LOWER icon 168, which lowers the vehicle and fully retracts the jack(s). The flat tire is returned to the trunk and the driver can safely operate the vehicle with the jack(s) compactly stowed beneath vehicle chassis.

The above-described device is not limited to the exact details of construction and enumeration of parts provided herein. For example, though the lifting mechanism has been primarily depicted and described as a scissor jack, the device could also include a hydraulic jack or any other suitable jack mechanism. Furthermore, the size, shape, and materials of construction of the various components can be varied without departing from the spirit of the present invention.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. In combination with a vehicle having front wheels, rear wheels and an undercarriage, an automated vehicle jack comprising:

a lower plate for positioning on a surface beneath said undercarriage;

an upper plate fixedly attached to the undercarriage and proximal at least one of said rear wheels and said front wheels;

a scissor jack positioned between said upper plate and said lower plate;

a motor connected to said scissor jack;

a controller in wireless communication with said motor, said controller having a display screen with a command button thereon that rotates said motor in either of two directions to expand and collapse said scissor jack, wherein said controller includes a motor driver in communication with said motor; and a software application on an electronic device, said software application in wireless communication with said motor driver, said software application generating a display on said electronic device, said display depicting said command button.

2. The automated vehicle jack according to claim 1 wherein said software application, upon initiation, depicts on said display concentric, circular rows of letters and numerals for entering a predetermined passcode to prevent unauthorized use of said application.

3. The automated vehicle jack according to claim 1 wherein either of said upper plate and said lower plate include a U-shaped cross section for accommodating said scissor jack in a collapsed position to prevent impact with underlying surfaces when said vehicle is traveling.

4. The automated vehicle jack according to claim 1 further comprising a foldable brace member extending from the motor to the upper plate to prevent the motor from spinning during operation.

5. The automated vehicle jack according to claim 1 wherein said command button discretely corresponds to one of said front wheels and said rear wheels to engage the motor that is nearest to said one of the front wheels and said rear wheels.

6. The automated vehicle jack according to claim 5 wherein said command button is backlit with LEDs that illuminate in either of two colors to indicate if a problem is detected.

7. The automated vehicle jack according to claim 1 further comprising an adapter connected to an onboard diagnostics system within the vehicle, said adapter in wireless communication with said software application, wherein said software application interrogates said adapter to prevent initiation of said software application if said vehicle is moving, a vehicle engine is running or if the vehicle is not in park mode.

* * * * *